United States Patent
Studor et al.

(10) Patent No.: US 9,950,918 B2
(45) Date of Patent: Apr. 24, 2018

(54) AUTOMATED BEVERAGE GENERATING SYSTEM AND METHOD OF OPERATING THE SAME

(71) Applicant: Briggo, Inc., Austin, TX (US)

(72) Inventors: Charles F. Studor, Austin, TX (US); Raymond William Hudy, Austin, TX (US); John S. Craparo, Georgetown, TX (US); Marwan Hassoun, Austin, TX (US)

(73) Assignee: Briggo, Inc., Austin, TX (US)

( * ) Notice: Subject to any disclaimer, the term of this patent is extended or adjusted under 35 U.S.C. 154(b) by 0 days.

(21) Appl. No.: 15/045,735

(22) Filed: Feb. 17, 2016

(65) Prior Publication Data

US 2016/0159634 A1   Jun. 9, 2016

Related U.S. Application Data (62) Division of application No. 14/212,887, filed on Mar. 14, 2014, now Pat. No. 9,533,866.
(Continued)

(51) Int. Cl.
*B67D 1/00* (2006.01)
*B67D 3/00* (2006.01)
(Continued)

(52) U.S. Cl.
CPC ............ *B67D 1/0888* (2013.01); *A47J 31/40* (2013.01); *A47J 31/52* (2013.01); *A47J 31/56* (2013.01);
(Continued)

(58) Field of Classification Search
CPC .. B67D 1/0888; B67D 3/0003; B67D 3/0019; B67D 3/0022; G06Q 50/12; G06Q 50/01; G06Q 20/18; G06Q 30/0201; G06Q 30/0255; G06Q 30/06; G06F 12/00; G06F 17/30
(Continued)

(56) References Cited

U.S. PATENT DOCUMENTS 6,202,101 B1   3/2001 Chin et al.
8,495,950 B2   7/2013 Fedele et al.
(Continued)

FOREIGN PATENT DOCUMENTS

KR   20110038610 A   4/2011

OTHER PUBLICATIONS

International Search Report for International application No. PCT/US2014/028287, dated Aug. 7, 2014, 3 pages.

*Primary Examiner* — Reginald L Alexander
(74) *Attorney, Agent, or Firm* — Reising Ethington P.C.

(57) ABSTRACT

A method of operating an automated beverage generating system. The method comprises receiving one or more electrical signals representative of an order for a specified beverage. The method further comprises translating the order into one or more steps required to generate the specified beverage. The method still further comprises entering at least one of the required steps into a dynamic sequence corresponding to a module of the system configured to perform that particular step, the dynamic sequence representing an order in which one or more steps in the dynamic sequence will be performed by the module for one or more beverages to be generated by the system.

15 Claims, 4 Drawing Sheets

Related U.S. Application Data (60) Provisional application No. 61/792,128, filed on Mar. 15, 2013.

(51) Int. Cl.
*B67D 1/08* (2006.01)
*A47J 31/56* (2006.01)
*A47J 31/40* (2006.01)
*A47J 31/52* (2006.01)
*G07F 13/10* (2006.01)
*G06Q 50/12* (2012.01)

(52) U.S. Cl.
CPC ............ *B67D 3/0003* (2013.01); *G07F 13/10* (2013.01); *B67D 3/0019* (2013.01); *B67D 3/0022* (2013.01); *G06Q 50/12* (2013.01)

(58) Field of Classification Search
USPC .......... 426/231, 433; 700/95, 109, 117, 232, 700/233, 234, 236, 237, 244
See application file for complete search history.

(56) References Cited

U.S. PATENT DOCUMENTS

| | | | |
|---|---|---|---|
| 9,105,041 B2* | 8/2015 | Harman | G06Q 30/06 |
| 9,420,911 B2* | 8/2016 | Bombeck | A47J 31/24 |
| 2004/0088702 A1 | 5/2004 | Garthwaite et al. | |
| 2009/0222126 A1 | 9/2009 | Hsu | |
| 2010/0268378 A1* | 10/2010 | Sharpley | A47J 31/52 |
| | | | 700/233 |
| 2011/0041701 A1 | 2/2011 | Chatterjee et al. | |
| 2011/0212231 A1 | 9/2011 | McLaughlin | |
| 2012/0055342 A1 | 3/2012 | Traitler et al. | |
| 2012/0095585 A1* | 4/2012 | Agarwal | G06Q 10/06 |
| | | | 700/109 |
| 2012/0156337 A1 | 6/2012 | Studor et al. | |
| 2013/0309373 A1 | 11/2013 | Tan et al. | |
| 2014/0072679 A1 | 3/2014 | Balassanian | |
| 2014/0277703 A1 | 9/2014 | Studor et al. | |
| 2016/0027132 A1* | 1/2016 | Craparo | G06Q 10/0836 |
| | | | 705/15 |

* cited by examiner

AUTOMATED BEVERAGE GENERATING SYSTEM AND METHOD OF OPERATING THE SAME

CROSS-REFERENCE TO RELATED APPLICATION

This application is a divisional of U.S. patent application Ser. No. 14/212,887, filed Mar. 14, 2014, which claims the benefit of U.S. Provisional Application No. 61/792,128, filed Mar. 15, 2013. The entire contents of both of the above-identified applications are hereby incorporated by reference.

TECHNICAL FIELD

This disclosure relates generally to systems and methods for generating beverages, and more particularly to automated beverage generating systems and methods of operating the same.

BACKGROUND

Known automated beverage generating systems may comprise any number of components to facilitate the ordering of a beverage by a customer, the generation or production of the ordered beverage, and ultimately the delivery of the beverage to the customer. Such systems may include or support, for example, one or more user input devices to allow a customer to select or order a desired beverage, one or more components or modules configured to contribute to the generation or production of the desired beverage, and one or more delivery mechanisms to deliver the completed beverage to the customer. These systems typically operate on a first in, first out—or FIFO—basis or scheme wherein orders for beverages are filled in the order that they are received. In other words, in certain systems, all of the steps required for generating a first beverage are performed to completion prior to commencing the generation of a second, later ordered beverage. One drawback of these types of systems is that resources of the system used to produce the second beverage, but not required to produce the first beverage, remain idle during, and until the completion of, the production of the first beverage. In other FIFO-based systems that are able to pipeline steps of multiple beverages (i.e., start a step of a second beverage before completing the first beverage), resources of the system may still sit idle due to the fact that not all of the beverages being produced or generated have a need for the same resources. As such, because of the linear/assembly line nature of such systems, a beverage may be waiting at a system resource that it does not need, and thus, will suffer from the same drawback identified above. In either instance described above, the utilization of at least some of the system resources used to generate beverages may not be optimized, and the throughput of the system may not be maximized.

SUMMARY

According to one embodiment, there is provided a method of operating an automated beverage generating system. The method comprises: receiving one or more electrical signals representative of an order for a specified beverage; translating the order into one or more steps required to generate the specified beverage; and entering each required step into a dynamic sequence corresponding to a module of the system configured to perform that particular step, the dynamic sequence representing an order in which one or more steps in the dynamic sequence will be performed by the module for one or more beverages to be generated by the system.

According to another embodiment, there is provided an automated beverage generating system. The system comprises an electronic processing unit and an electronic memory device electrically coupled to the electronic processing unit and having instructions stored therein. The processing unit is configured to access the memory device and execute the instructions stored therein such that is operable to: receive one or more electrical signals representative of an order for a specified beverage; translate the order into one or more steps required for generating the specified beverage; and enter each required step into a dynamic sequence corresponding to a module of the system that is configured to perform that step, wherein the dynamic sequence represents an order in which the module will perform one or more steps in the dynamic sequence for one or more beverages to be generated by the system.

According to another embodiment, there is provided a non-transitory, computer-readable storage medium storing instructions thereon that when executed by one or more computers causes the one or more computers to: receive one or more electrical signals representative of an order for a specified beverage; translate the order into one or more steps required for generating the specified beverage; and enter each required step into a dynamic sequence corresponding to a module of the system that is configured to perform that step, wherein the dynamic sequence represents an order in which the module will perform one or more steps in the dynamic sequence for one or more beverages to be generated by the system.

DESCRIPTION OF THE DRAWINGS

One or more embodiments of the invention will hereinafter be described in conjunction with the appended drawings, wherein like designations denote like elements, and wherein.

DETAILED DESCRIPTION OF EMBODIMENTS

The methods and systems described herein may be used to generate or produce beverages, such as, for example and without limitation, brewed beverages (e.g., hot or cold brewed beverages). For purposes of this disclosure, the phrase "brewed beverages" or "brewed beverage" is intended to mean any consumable beverage that is made through a process in which a liquid and one or more ingredients are combined though one or more of mixing, stirring, boiling, steeping, infusion, frothing, pressurization, and/or fermentation over a prescribed period of time. Examples of brewed beverages include, but are not limited to, coffee, tea, espresso, and beer. It will be appreciated that while the description below is primarily with respect to the production of brewed beverages, the present disclosure is not meant to be so limited. Rather, the methods and systems described herein may also be used to produce other types of prepared beverages, such as, for example, hot chocolate and energy drinks, to name a few. In any event, the system may be implemented as, and the methods may be performed by, a single, fully-automated kiosk such as, for example, that or those described in U.S. Pat. No. 8,515,574 issued on Aug. 20, 2013 and U.S. Patent Publication No. 2013/0087050 published on Apr. 11, 2013, the contents of each of which are hereby incorporated by reference in their entireties. The systems and methods described herein may be used to, among other things, establish a production schedule for beverages ordered through the system, and to then use that or those schedules to prepare of generate the ordered beverage(s).

Figure 1:
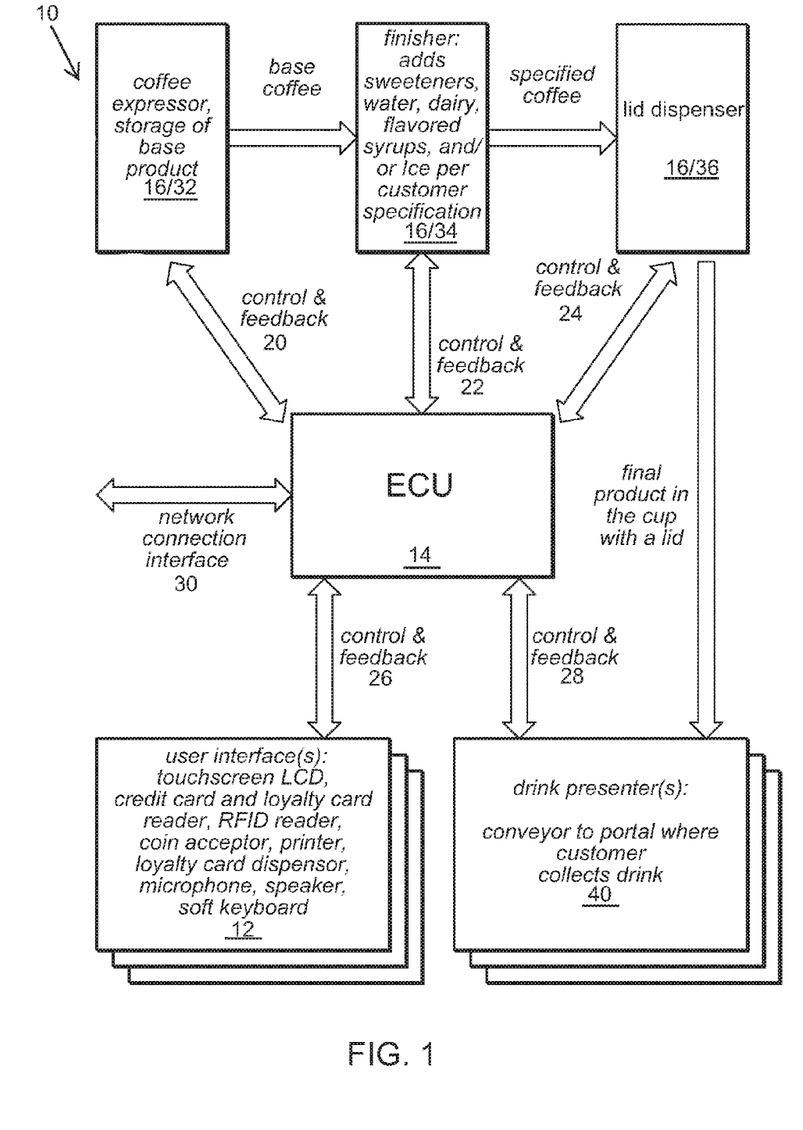
FIG. 1 is a schematic and diagrammatic view of an automated system for generating beverages.

Referring now to the drawings wherein like reference numerals are used to identify identical or similar components in the various views, FIG. 1 depicts an illustrative embodiment of an automated system 10 (hereinafter referred to as "kiosk 10") for generating or preparing beverages, such as, for example, brewed beverages (e.g., coffee, espresso, tea, etc.). The kiosk 10 comprises a plurality of components or modules that may allow for a fully automated kiosk having the functionality to, in general terms, take ground coffee or beans as an input and generate a fully lidded brewed beverage as an output. To that end, the kiosk 10 may include or be configured to support, among other components, one or more user input devices 12, an electronic control unit 14 (ECU 14), and one or more process components or modules 16. In various embodiments, kiosk 10 may further comprise, among potentially other components, a cup handler, a presentation area, and various actuators, sensors, and/or other components, some of which may be described below.

As shown in the example illustrated in FIG. 1, the kiosk 10 may include or support one or more user input devices 12. While the particular number of user input devices that the kiosk 10 may include or support may be unlimited, for purposes of illustration and clarity, the description below will be with respect to an embodiment wherein the kiosk 10 includes a single user input device 12. It will be appreciated that in embodiments wherein the kiosk 10 includes or supports multiple user input devices, the description below would apply with equal weight to each user input device of or supported by the kiosk 10.

In an embodiment the user input device 12 may be disposed within the outer housing or enclosure of the kiosk 10 or disposed in close proximity thereto such that it comprises part of the kiosk 10 itself, and is accessible to customers; while in another embodiment, the user input device 12 may be separate and distinct from the structure of the kiosk 10 (e.g., the device 12 may be remotely located from the kiosk 10). In any event, the user input device 12 may be directly or indirectly electrically connected to (e.g., hardwired or wirelessly), and configured for communication with, the ECU 14 of the kiosk 10, and may comprise or include any number of devices suitable to display or provide information to and/or receive information from a customer. As such, the user input device 12 may comprise any combination of hardware, software, and/or other components that enables a customer to communicate or exchange information with the ECU 14 and/or one or more other components of the kiosk 10. More particularly, the user input device 12 may comprise or include one or a combination of any number of known devices, such as, for example and without limitation: a personal computer; a liquid crystal display (LCD); a touch screen; a cathode ray tube (CRT); a plasma display; a keypad; a keyboard; a computer mouse; a microphone; a speaker; a handheld device (e.g., telephone, smart phone, tablet, personal digital assistance (PDA), etc.); a device with a world wide web interface; or any other suitable device. As such, it will be appreciated that the present disclosure is not limited to any specific user input device or combination of devices.

The user input device 12 may further include a processor or processing device and an electronic memory device. The processor may include any type of suitable electronic processor (e.g., programmable microprocessor, microcontroller, central processing unit (CPU), application specific integrated circuit (ASIC), etc.) that is configured to receive and process data/information and/or execute appropriate programming instructions for software, firmware, programs, applications, algorithms, scripts, etc., necessary to perform various functions, such as for example, one or more steps of the methodology described below. The memory device may include any type of suitable electronic memory means and may store a variety of data and information. This includes, for example, software (e.g., code or logic), firmware, programs, applications, algorithms, scripts, etc., required to perform one or more of the functions described herein.

In addition to the above, the user input device 12 may further include one or more communication interfaces that may include or be electrically connected to certain communication-supporting infrastructure of the user input device 12 (e.g., one or more known components/devices, such as, for example, routers, modems, antennas, electromechanical ports, transceivers, etc.) to allow for the communication and exchange of information/data between the user input device 12 and other components of the system, for example, the ECU 14, via a suitable communication network (e.g., a public or private network (e.g., the internet)) and/or using suitable communication techniques or protocols. More particularly, the communication network may comprise a wired or wireless network, such as, for example: a suitable Ethernet network; radio and telecommunications/telephony networks (e.g., cellular networks, analog voice networks, or digital fiber communications networks); or any other suitable type of network and/or protocol (e.g., local area networks (LANs), wireless LANs (WLANs), broadband wireless access (BWA) networks, personal area networks (PANs), publicly switched telephone networks (PSTNs), etc.). The communication network may be configured for use with one or more standard communications technologies and protocols, and may utilize links using known technologies, such as, for example, Ethernet, IEEE 802.11, integrated services digital network (ISDN), digital subscriber line (DSL), as well as other known communications technologies. Similarly, the networking protocols used on a network to which some or all of the components of the kiosk 10 are interconnected may include multi-protocol label switching (MPLS), the user datagram protocol (UDP), the hypertext transport protocol (HTTP), the simple mail transfer protocol (SMTP), and the file transfer protocol (FTP), among other suitable network protocols. In an embodiment, the transmission control protocol/Internet protocol (TCP/IP) may be used, in which case it will be appreciated that each component configured for communication using such a protocol can be configured with a static IP address or can be set up to automatically receive an assigned IP address from another device on the network. Further, the data or information exchanged over such a network by the network interfaces of the various components may be represented using technologies, languages, and/or formats, such as the hypertext markup language (HTML), the extensible markup language (XML), and the simple object access protocol (SOAP)

among other suitable data representation technologies. Additionally, some or all of the links or data may be secured or encrypted using any suitable encryption technique or technology, such as, for example, the secure sockets layer (SSL), secure HTTP, and/or virtual private networks (VPNs), the international data encryption standard (DES or IDEA), triple DES, Blowfish, RC2, RC4, RC5, RC6, as well as other known suitable data encryption standards and protocols. In other embodiments, custom and/or dedicated data communications, representation, and encryption technologies and/or protocols may be used instead of, or in addition to, the particular ones described or identified above. Furthermore, it will be appreciated that in an embodiment, the various components (e.g., the user input device 12, the ECU 14, etc.) may each be configured to communicate with one or more other components using more than one communication technique or protocol as a fail-safe so as to provide redundancy and flexibility in the event a given technique or protocol is rendered unusable for any reason, or different components communicate using different protocols or techniques.

It will be further appreciated that depending on the particular implementation, the distance from the user input device 12 to the ECU 14 may range from a matter of feet to an unlimited number of miles. Accordingly, the particular communication techniques and protocols used may depend in large part on the relative distance between the devices or components communicating with each other, as well as on the availability of certain infrastructure required for the various techniques/protocols (e.g., cellular reception, existence of PSTN lines, etc.). Accordingly, in view of the foregoing, the communication between, for example, the user input device 12 and the ECU 14 may be facilitated in any number of ways using any number of techniques, and therefore, the present disclosure is not limited to any one particular way or technique(s); rather, any suitable way or technique may be utilized.

Figure 2A:
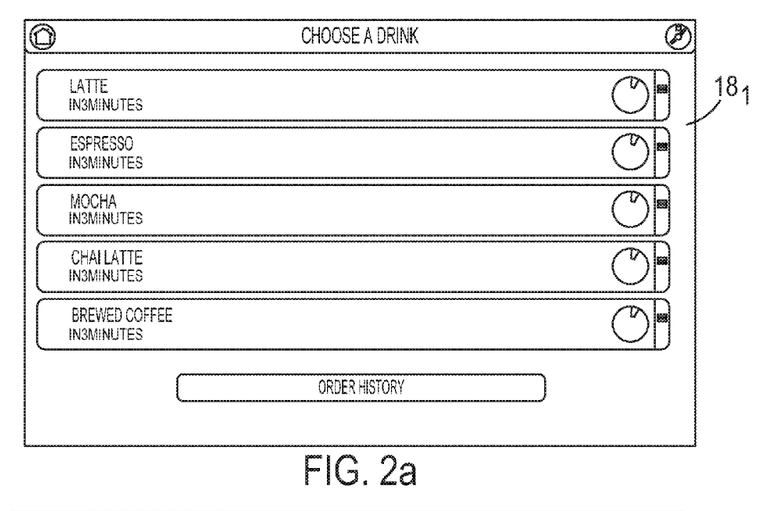
FIGS. 2a and 2b illustrate examples of graphical user interfaces (GUIs) that may be displayed on a user input device of the system illustrated in FIG. 1, and that may used by customers to order beverages.
Figure 2B:
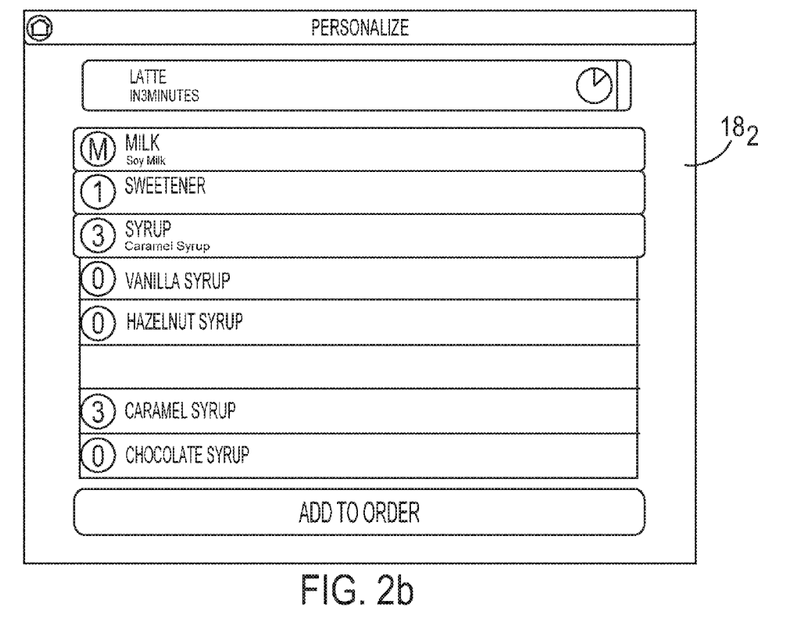

With reference to FIGS. 2a and 2b, in an illustrative embodiment, the user input device 12 may include and/or be configured to display one or more user interfaces 18 (e.g., user interfaces $18_1$, $18_2$), for example, graphical user interface(s) (GUI(s)), text-based user interface(s), etc., which may be used in conjunction with a component of the user input device 12 (e.g., a text-based interface may be displayed on a display device of the user input device 12 and a keyboard of the user input device 12 may be used in conjunction with the user interface 18, a GUI may be displayed on a display device of the user input device 12 and a mouse of the user input device 12 may be used in conjunction with the user interface 18, etc.). In any event, one or more components of the kiosk 12 (e.g., the ECU 14, a software application stored in the memory of the user input device 12, etc.) may be configured to generate one or more user interfaces 18 in the form of graphical and/or text-based interface(s) having one or more user-selectable or user-inputtable fields, icons, links, drop-down menus, etc. that may be displayed on a suitable display device and allow a customer to interact or communicate with, for example, the ECU 14. It will be appreciated that in an embodiment wherein a user interface is communicated to the user input device 12 from, for example, the ECU 14, such communication may be facilitated through the communication interface of the user input device 12 and across a suitable communication network using any number of well known and suitable communication techniques and protocols, such as, for example, one or more of those described below.

In any event, the user input device 12 is operable to provide an interactive interface that allows a customer to interact with other components of the kiosk 10 for the purposes described below. For instance, the user input device 12 may be configured to allow a customer to place an order for a desired beverage (e.g., the user interface $18_1$ illustrated in FIG. 2a), customize or personalize the beverage (e.g., the user input device $18_2$ illustrated in FIG. 2b), and provide other information relating to the beverage, for example, a requested time the customer would like to pick-up an ordered beverage, to cite a few possibilities. Accordingly, the user input device 12 may be configured to prompt a user to input certain information (e.g., the selection of a beverage to be produced; user identifying information; etc.), and to also provide a means by which such information may be inputted (e.g., user-selectable or user-inputtable fields or links). The input provided by the user may then be communicated to, for example, a component of kiosk 10 (e.g., ECU 14), which may then take certain action(s) in response to the received input. In an embodiment, the communication between the user input device 12 and an intended recipient may be direct communication (i.e., electrical signals flow from the user input device 12 directly to the intended recipient (e.g., the ECU 14). In other embodiments, however, the communication may be indirect such that the input received at the user input device 12 may be routed and relayed from the user input device 12 to one or more other components and then to the intended recipient. For example, an input received at the user input device 12 may be routed first to a central host or server which may then relay the input to the kiosk 10. Similarly, in another example, the input received at the user input device 12 may be communicated first to a controller or ECU associated therewith, which may then relay the input to the intended recipient. In yet another example, the input received at a user input device 12 may be routed first through, for example, one or more intermediary components of the kiosk 10, such as, for example, a hub, a router, a modem, etc., prior to the input reaching the intended recipient. Accordingly, it will be appreciated that a user input received at the user input device 12 may be communicated to the intended recipient(s) in any number of ways, each of which remains within the spirit and scope of the present disclosure.

The ECU 14 of the kiosk 10 may be disposed within an outer housing or enclosure of kiosk 10, or alternatively, outside of such an enclosure but in close proximity thereto. In an embodiment, the ECU 14 comprises one or more electronic processing units and one or more electronic memory devices. In another embodiment, rather than or in addition to the ECU 14 comprising a memory device, kiosk 10 may include one or more memory devices that are separate and distinct from the ECU 14 (and the processing unit(s) thereof, in particular) but that is/are accessible thereby. The processing unit of the ECU 14 may include any type of suitable electronic processor (e.g., a programmable microprocessor or microcontroller, an application specific integrated circuit (ASIC), etc.) that is configured to execute appropriate programming instructions for software, firmware, programs, algorithms, scripts, etc., to perform various functions, such as, for example and without limitation, one or more steps of the methodologies described herein. The memory device, whether part of the ECU 14 or separate and distinct therefrom, may include any type of suitable electronic memory means and may store a variety of data and information. This includes, for example: software, firmware, programs, algorithms, scripts, and other electronic instructions that, for example, are required to perform or cause to be performed one or more of the functions described elsewhere herein (e.g., that are used (e.g., executed) by ECU 14 to perform various functions described herein); various data structures; operating parameters and characteristics of the kiosk 10 and the components thereof (e.g., individual sequences or queues associated with each component/module 16 of the kiosk 10, a master production schedule for preparing or generated beverages ordered through the kiosk 10, etc.); information (e.g., parameters, characteristics, etc.) relating to ingredients used in or by the kiosk 10; beverage recipes; etc. Alternatively, rather than all of the aforementioned information/data being stored in a single memory device, in an embodiment, multiple suitable memory devices may be provided. In any event, the aforementioned instructions may be provided as a computer program product, or software, that may include a non-transitory, computer-readable storage medium. This storage medium may have instructions stored thereon, which may be used to program a computer system (or other electronic devices, for example, the ECU 14) to implement the control some or all of the functionality described herein, including one or more steps of the methodology described below. A computer-readable storage medium may include any mechanism for storing information in a form (e.g., software, processing application) readable by a machine (e.g., a computer, processing unit, etc.). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical, or other types of medium suitable for storing program instructions. In addition, program instructions may be communicated using optical, acoustical, or other form of propagated signal (e.g., carrier waves, infrared signals, digital signals, or other types of signals or mediums.).

As will be described below, the ECU 14 may be electronically connected to other components of the kiosk 10 via I/O devices and suitable connections, such as, for example, a communications bus or a wireless link, so that they may interact as required. It will be appreciated, however, that the present disclosure is not meant to be limited to any one type of electronic connection, but rather any connection that permits communication between the ECU 14 and other components of the kiosk 10 may be utilized.

The ECU 14 may be configured to perform, or cause to be performed, some or all of the functionality of the kiosk 10, including, for example, some or all of those functions and features described herein (e.g., one or more steps of the method(s) described below). For example, and with reference to the illustrated embodiment depicted in FIG. 1, the ECU 14 may serve as a central or main controller that is configured to coordinate all user input devices 12, machine controls, sensors, and feedback (e.g., control and feedback illustrated at 20, 22, 24, 26, and 28 in FIG. 1). For example, all valves, heaters, pumps, servo motors, actuators, flow control mechanisms, and/or other electrical, mechanical, or electromechanical components of the components or modules 16 described below may be controlled by the ECU 14. Accordingly, in an embodiment, the ECU 14 may be configured to receive a request for the generation of a beverage from the user input device 12 and to then effect the generation of the specified beverage by controlling (directly or indirectly) the operation of, for example, one or more of the modules 16 of the kiosk 10 required to generate the specified beverage. In an illustrative embodiment, the ECU 14 may be further configured to exert at least a measure of control over the user input device 12 to cause, for example, messages to be displayed thereon notifying a customer, among possibly other things, that the beverage they ordered has been completed and is ready to be picked-up.

To facilitate the interaction and communication between the ECU 14 and other components of system 10 such as the user input device 12, the ECU 14 may comprise one or more network or communication interfaces 30 that may include or be electronically connected to, and configured for communication with, other infrastructure of the kiosk 10 (e.g., known components/devices such as, for example, routers, modems, antennas, electrical ports, transceivers, etc.) configured to facilitate and support one or more types of communication networks or techniques/protocols, such as, for example, those described elsewhere herein. In any event, network interface(s) 30 allows for the exchange of data/information between the ECU 14 and one or more other components of the kiosk 10.

It will be appreciated by those having ordinary skill in the art that while the ECU 14 is illustrated in FIG. 1 as a single component, in some embodiments, the functionality of the ECU 14 may be performed or caused to be performed by more than one ECU or other like component. For example, in an embodiment, the kiosk 10 may comprise a plurality of ECUs, each one of which is configured to perform or cause to be performed different functionality. For example, in an embodiment, a first ECU may be configured to control the modules 16 used to generate or produce beverages, while a second ECU may be configured to control the user input device 12. In such an embodiment, the various ECUs may be electronically connected to each other to allow for communication therebetween, and each may be configured to also communicate with other components of the kiosk 10 through, for example, dedicated network interfaces or other components thereof, or common network interface(s) of the kiosk 10. In another embodiment, the kiosk 10 may include a number of ECUs configured to control different functionality of the kiosk 10 (e.g., one or more of the modules 16 may have a dedicated or shared ECU), but also includes a "master" ECU that is configured to manage and control the operation of the individual ECUs so as to have a coordinated, multi-tiered control scheme for the kiosk 10. In such an embodiment, the master ECU may be the sole ECU that is configured to interface with other components of the kiosk 10, or alternatively, the individual dedicated ECUs may also be configured to interface with one or more other components of the kiosk 10.

While it will be apparent in view of the foregoing that any number of suitable control schemes or arrangements employing one or multiple ECUs or other suitable control/processing devices may be used to carry out the functionality of the kiosk 10 and the various components thereof, in particular, for purposes of illustration and clarity, the description below will be primarily with respect to an embodiment wherein the kiosk 10 includes a single ECU (i.e., the ECU 14) for controlling most, if not all, of the functionality of the kiosk 10 and the components thereof. It will be appreciated by those having ordinary skill in the art, however, that the present disclosure is not meant to be limited to such an embodiment, but rather any number of suitable control schemes and arrangements may be used and such other schemes and arrangements remain within the spirit and scope of the present disclosure.

As discussed above, the kiosk 10 may include one or more components or modules 16 (also known or referred to as "process modules," "control process modules," "execution modules," and "resource modules"). Each module 16 is configured to perform one or more processes (e.g., chemical or mechanical processes) required for generating or producing brewed beverages. In an illustrative embodiment, each module 16 is configured to perform one or more different processes than that or those performed by the other module(s) 16. Alternatively, two or more modules 16 may be configured to perform the same process(es) so as to add a measure of redundancy and flexibility to the kiosk 10 in case one such process module fails or is otherwise inoperable, or there is a high demand for the process(es) performed by those modules 16 (e.g., when multiple beverages are being prepared at least partially simultaneously). The modules 16 may take any number of forms. For example, and as illustrated in FIG. 1, one type of module is an expressor unit 32 that is configured, for example, to brew coffee. Another type of module is a finisher unit 34 that is configured, for example, to dispense one or more refrigerated or non-refrigerated additives required for various beverages (e.g., flavored syrup, dairy (e.g., cold milk), ice, sweeteners, water, etc.). Yet another type of module is a lidding module or lid dispenser 36 that, as the name suggests, is configured to dispense lids for placement on cups containing completed or partially completed beverages. Other types of modules may include, but are not limited to, a cup dispenser (denester), a frothing module, and a label module, among possibly others. Accordingly, in an illustrative embodiment, the kiosk 10 includes an array of modules 16 that are configured to perform a variety of beverage production-related processes.

As was briefly described above, in an embodiment, the operation of each module 16 is controlled by the ECU 14. Accordingly, in such an embodiment, each module 16 is electronically connected to, and configured for communication with, the ECU 14. It will be appreciated as described above, however, that in other embodiments, one or more of the modules 16, or one or more of the components thereof, may be alternatively controlled by a dedicated ECU that, as described above, is under the control of the ECU 14, or by another ECU of the kiosk 10 or a larger system of which the kiosk 10 is a part (e.g., a central host).

Figure 3:
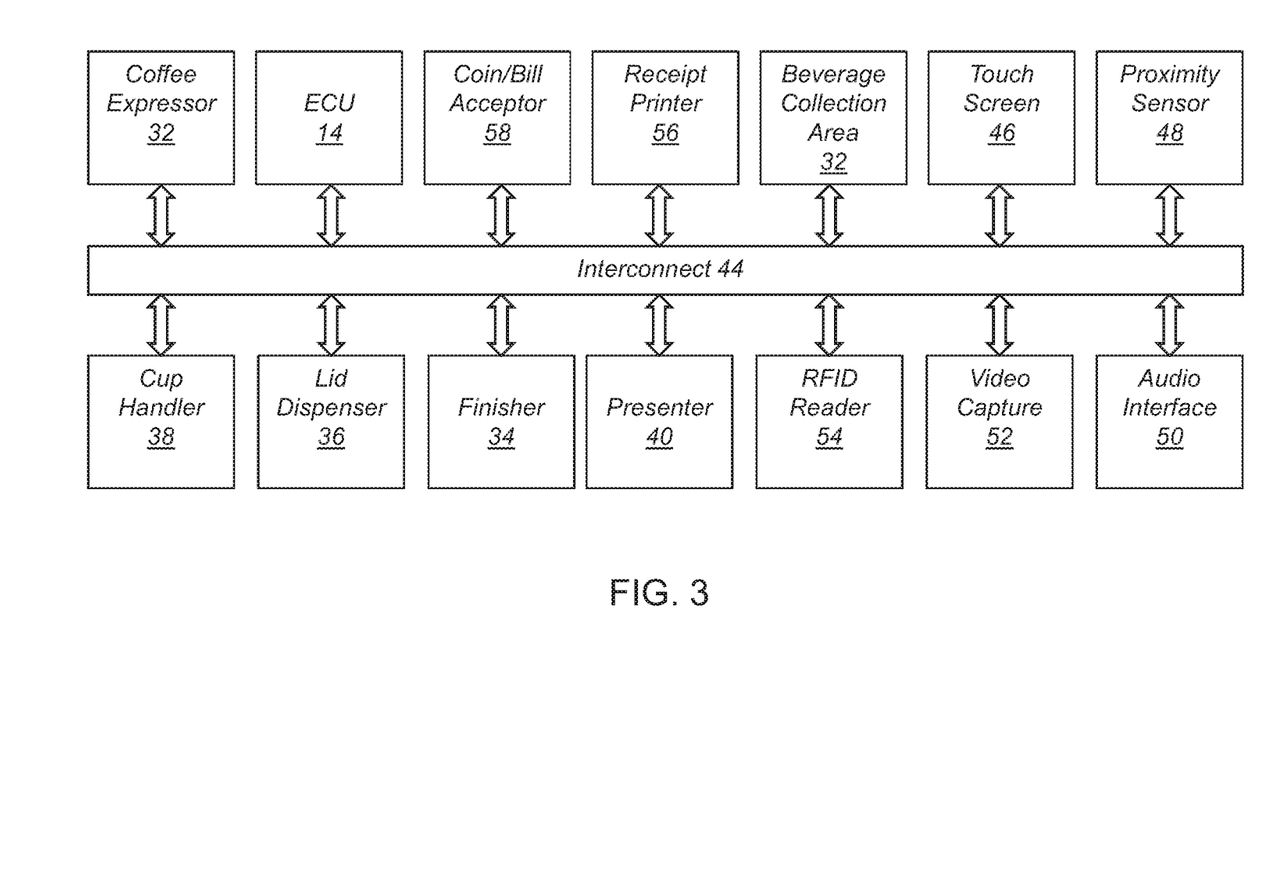
FIG. 3 is a diagrammatic and schematic view of an example of an interconnection of various components of the system illustrated in FIG. 1.

In addition to the modules 16 described above, the kiosk 10 may also comprise additional components such as, for example, a cup handler 38 (shown diagrammatically in FIG. 3). In an embodiment, the cup handler 38, as the name suggests, is configured to handle the cups into which beverages being generated by the kiosk 10 are dispensed. The cup handler 38 may comprise one or more actuators (e.g., XYZ actuators) configured to move or manipulate the position of a cup into which a specified beverage is to be dispensed among various locations within the kiosk 10 during the generation or production of the specified beverage. In various embodiments, these locations may include, for example: a location where empty cups are stored (e.g., a cup dispenser/denester); locations corresponding to various modules 16 at which different ingredients or components of the beverage may be added or dispensed into the cup; locations where partially completed and/or completed beverages are temporarily stored (e.g., a staging or work-in-process (WIP) area of the kiosk 10); a location corresponding to the lid dispenser module 36; and a location where a beverage presenter component of the kiosk 10 is disposed. In an embodiment, the operation of the cup handler 38 is controlled by the ECU 14; though the present disclosure is not intended to be so limited.

As illustrated in FIG. 1, the kiosk 10 may further comprise one or more beverage presenters 40. The beverage presenter(s) 40 serve to transfer a completed beverage generated by the kiosk 10 to an area at which a customer may retrieve the beverage s/he ordered. In an embodiment, the beverage presenter 40 may include, for example, a conveyor, carousel, platform, or other suitable mechanism upon which the cup handler 38 places a completed beverage and that moves or delivers the beverage to, for example, a customer-accessible presentation or final product collection area 42 (diagrammatically illustrated in FIG. 3 as "beverage collection area 42") where the beverage may be retrieved by the customer. This presentation area may comprise, for example, an area behind a door or window that is accessible upon the door or window opening. More particularly when a beverage is ready for retrieval by the corresponding customer, it is placed into the presentation area 42. When the kiosk 10 recognizes that the customer has arrived or is in vicinity of the kiosk 10 (e.g., through, for example, an input to the user input device 12), the door or window to the presentation area 42 may be opened so that the customer may access the presentation area 42 and retrieve his/her beverage. In various embodiments, the kiosk 10 may include one or more presentation areas 42 that may be utilized to present beverages ordered in different ways (e.g., one presentation area for beverages ordered directly at the kiosk 10 for immediate delivery, and another presentation area for pre-ordered beverages that are ordered in advance of a desired pick-up time). As with other components described above, in an embodiment, the operation of presenter 40 and/or presentation or final product collection area 42 may be controlled by the ECU 14.

In view of the foregoing, it will be apparent that some or all of the components of the kiosk 10 are interconnected to allow for communication and exchange of information therebetween. To that end, FIG. 3 illustrates various interconnected components of an illustrative embodiment of the kiosk 10. In this example, all of the illustrated components are connected to a central interconnect 44 (e.g., a communication bus), or alternatively, one or more components may be electronically connected (e.g., by one or more wires or cables, or wirelessly) to one or more other components. In the illustrated embodiment, it is through interconnect 44 that the ECU 14 may receive feedback and other inputs from various components of the kiosk 10 (e.g., modules 16, cup handler 38, presenter 40, etc.) and may issue commands (e.g., in the form of machine instructions or signal values) to those components. In various embodiments, one or more user input device 12, such as, for example, a touch screen 46, proximity sensor 48, audio interface 50 (including a microphone and/or speaker), video capture device 52, RFID reader 54, receipt printer 56, coin/bill acceptor/changer 58, credit card/loyalty card reader 60, and/or loyalty card dispenser 62, may provide a customer interface and/or maintenance interface, as controlled by the ECU 14.

While certain components of an illustrative embodiment of the kiosk 10 have been specifically identified and described above, it will be appreciated that in other embodiments, the kiosk 10 may include additional components or, conversely, may include less than all of the components specifically identified above. Accordingly, the present disclosure is not meant to be limited to any particular arrangement of the kiosk 10.

Figure 4:
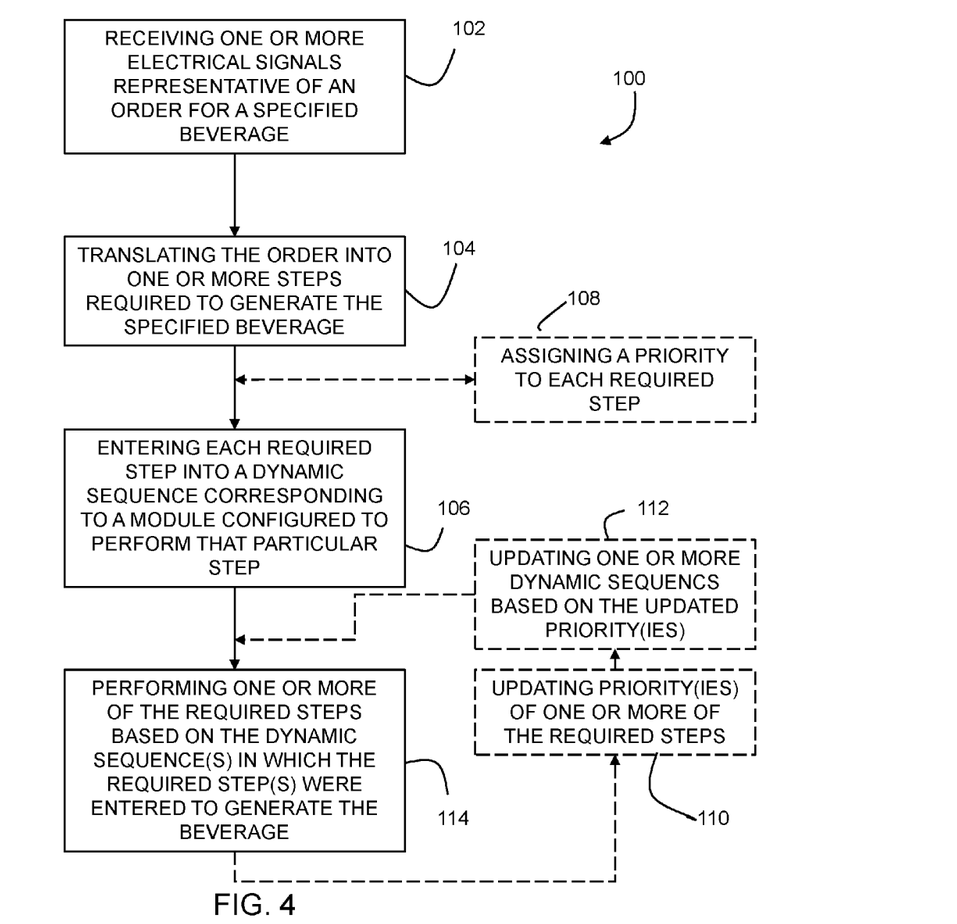
FIG. 4 is a flow diagram of an illustrative method of operating an automated beverage generating system.

Referring now to FIG. 4, there is shown a method 100 of operating an automated beverage generating system, and more particularly, a method for managing a beverage production schedule for beverages ordered through the system. For purposes of illustration and clarity, method 100 will be described in the context of the kiosk 10 described above. It will be appreciated, however, that the application of the present methodology is not meant to be limited solely to such an implementation, but rather method 100 may find application with any number of other types or implementations of automated beverage generating systems. Additionally, it should be noted that while the steps of method 100 will be described as being performed or carried out by one or more particular components of the kiosk 10 (e.g., the ECU 14), in other embodiments, some or all of the steps may be performed by components of the kiosk 10, or constituent sub-components thereof, other than that or those described, or components not part of the kiosk 10 but configured for use therewith (e.g., a central host of a larger system of which the kiosk 10 is a part, for example). Accordingly, it will be appreciated that the present disclosure is not limited to an embodiment wherein particular components described herein are configured to perform the various steps.

In an embodiment, method 100 includes a step 102 of receiving one or more electrical signals representative of an order for a specified beverage. In an embodiment, the one or more electrical signals are ultimately received by the ECU 14 of the kiosk 10, and therefore, in such an embodiment, step 102 is performed by the ECU 14. The electrical signals representative of the specified beverage may be generated in a number of ways. In an embodiment, a customer places an order for a desired beverage using, for example, a user input device of, or supported by, the kiosk 10 (e.g., the user input device 12), and the electrical signal(s) are generated in response thereto. More specifically, in an embodiment, and as described in greater detail above and illustrated in FIGS. 2a and 2b, the user input device 12 may include, or have displayed on a display device thereof, a graphical user interface (GUI) $18_1$ that may be used to select a desired beverage from among a plurality of beverage options. The beverage options may include standard, predetermined beverages produced by the kiosk 10 or, in certain instances, may include a list of beverages that a given customer has indicated are his favorites or that s/he had previously ordered. In any event, the customer may interact with the GUI $18_1$ to select a particular beverage.

Once a particular beverage has been selected as described above, in certain embodiments, a customer may be permitted to customize or personalize the selected beverage. In such an instance, this may be accomplished through the same GUI used to initially select the beverage or a different GUI such as, for example, the GUI $18_2$ illustrated in FIG. 2b. Accordingly, as shown in FIG. 2b, the GUI $18_2$ may present a customer a number of selectable customization/personalization options, including, for example, various additives or ingredients that may be added to, or used in the production of, the beverage from which the customer may make one or more selections. It will be appreciated that in certain instances, the beverage may be further customized by allowing a customer to select particular amounts or specific types of additives to be added to, or used in the production of, the beverage, as well as to make selections relating to other parameters of the beverage, such as, for example, a temperature the customer would like the beverage to be at when it is presented to him.

Whether or not a selected beverage is customized, once a customer has completed his order, the order may be stored, for example, in an object class that contains the entire order (e.g., the specified beverage). One or more electrical signals representative of the order may then be generated by, for example, the user input device 12, and a processing device thereof, in particular. These electrical signals may then be transmitted or communicated (e.g., over one or more wires or wirelessly) directly or indirectly to the ECU 14 of the kiosk 10.

Upon receipt of the one or more electrical signals representative of the order in step 102, method 100 may proceed to a step 104 of translating the order into one or more commands or steps required to generate the specified beverage. This may be done in a number of ways. For example, in an illustrative embodiment, step 104 comprises using the order received in step 102 and a data structure, for example, a one- or multiple-dimensional look-up table, that correlates ordered beverages with required steps to generate those beverages to determine the plurality of steps required to generate the specified beverage. Accordingly, in such an embodiment, step 104 may comprise inputting or looking up the specified beverage in an appropriate data structure to determine the steps required to generate that beverage. The data structure may be stored in an electronic memory device of the kiosk 10, and more particularly, an electronic memory device that is part of or accessible by the ECU 14 of the kiosk 10. While one particular way of performing the translating step 104 has been provided, it will be appreciated that the present disclosure is not intended to be limited to any particular way of translating a received order, but rather any suitable way may be used. In an embodiment, the translating step 104 is performed by the ECU 14 (or a resource manager or scheduler residing in the ECU 14).

Following the translation of the order in step 104, method 100 may comprise a step 106 of entering each of the required steps determined in the translating step 104 into a dynamic sequence corresponding to or associated with one or more modules 16 of the kiosk 10 that is/are configured to perform that particular step. For instance, in an embodiment wherein the specified beverage has been translated into two steps, for example, a coffee dispensing step and a lidding step, the coffee dispensing step will be entered into a dynamic sequence that corresponds to a coffee expressor module or unit (e.g., the coffee expressor unit 32 of the kiosk 10), and the lidding step will be entered into a dynamic sequence corresponding to a lid dispenser or lidding module (e.g., the lid dispenser 36 of the kiosk 10). In any event, the dynamic sequence into which each of the required steps is entered in step 106 represents an order in which the steps in that dynamic sequence will be performed or executed by a module 16 associated with that sequence.

In an illustrative embodiment, each dynamic sequence is contained or embodied in a queue associated with the module 16 to which the sequence corresponds. For each module 16, the queue corresponding thereto may be stored and maintained in an electronic memory device of the module 16 itself (e.g., in an electronic memory that is part of or accessible by an ECU of the module). Accordingly, in an embodiment such as that described above wherein the kiosk 10 includes the coffee expressor unit 32, the finisher unit 34, and the lid module 36, the queue associated with the expressor unit 32 is stored and maintained by the expressor unit 32, the queue associated with the finisher unit 34 is stored and maintained by the finisher unit 34, and the queue associated with the lidding modules 36 is stored and maintained by the lidding module 36. Alternatively, some or all of the queues may be stored or maintained in an electronic memory device that is part of or accessible by the ECU 14 of the kiosk 10. Accordingly, it will be appreciated that the present disclosure is not intended to be limited to any particular arrangement for storing and maintaining the queues associated with the module(s) 16.

Regardless of where the queue(s) are stored, for each step required to generate the specified beverage, the entering step 106 may comprise the ECU 14 of the kiosk 10 accessing the queue(s) associated with one or more modules 16 of the kiosk 10 that is/are configured to perform the required step, and to then enter the required step for the specified beverage into an empty slot or breakpoint/insertion point in the queue associated with at least one of the one or more modules 16 (i.e., a position within the queue where an associated module 16 would be otherwise sitting idle if not for the entry of a required step therein). The empty slot into which the step for the specified beverage is entered corresponds to a position in the queue at which the step for the specified beverage will be performed or executed by the module 16 relative to one or more other steps in the queue for generating one or more other beverages.

For example, in an embodiment wherein the required step comprises a frothing process and the kiosk 10 includes a single frothing module, the ECU 14 will access the queue associated with the frothing module and enter the frothing step for the specified beverage into an empty slot in that queue. In another embodiment wherein the kiosk 10 includes two or more frothing modules, each having a respective queue associated therewith, the ECU 14 may access each of the queues for the frothing modules and then enter the frothing step for the specified beverage into an empty slot in one of those queues.

The particular empty slot into which the required step is entered may be dependent upon any number of factors or considerations. One such factor may be the current state of the queue(s) associated with the module(s) 16 configured to perform that step. For example, if there is only one empty slot in the queue(s)—which may be at the end of the queue or between two other slots that are currently occupied—the required step for the specified beverage may, by default, be entered into that empty slot. This is equivalent to changing the sequence of steps being performed by that particular module. In an instance where there are multiple empty slots in the queue(s), a number of other additional or alternative factors/considerations may be taken into account, including, but certainly not limited to, the pipelining and traffic engineering of one or more of the modules 16 of the kiosk 10, and the optimization of the utilization of the module(s) 16.

For example, if, for a required step, there are multiple empty slots in the queue(s) of one or more modules 16 configured to perform that step, the required step may be entered into an empty slot that will not conflict or overlap with the performance of another one of the required steps for the specified beverage, and that best fits into the overall flow of the generation of the specified beverage (e.g., that will not result in the beverage having to wait too long in between steps). Taking the example described above wherein the specified beverage requires a coffee dispensing step and a lidding step, the lidding step obviously needs to be performed following the coffee dispensing step. Accordingly, the lidding step will be entered into an empty slot of a queue associated with a lidding module that will result in the lidding step being performed subsequent to the coffee dispensing step. Accordingly, in an embodiment, when entering a required step into a queue associated with one or more modules 16, the ECU 14 may be configured to take into account the relative timing of when other required steps of the specified beverage are to be performed (i.e., the position(s) of one or more other required steps in their corresponding queue(s)), and/or the steps required to generate other beverages in determining which empty slot the required step is to be entered into.

In an instance wherein there are two or more modules 16 that are configured to perform a required step, each having a respective queue associated therewith, the required step for the specified beverage may be entered into an empty slot of the least populated queue. In other words, the required step may be entered into an empty slot of the queue associated with the least busy module 16 so as to increase and optimize the utilization of that module 16, and therefore, the kiosk 10 as a whole.

In an embodiment, following the translating step 104 but prior to the entering step 106, method 100 may comprise a step 108 of determining or assigning a priority or weight for each step required to generate the specified beverage. For each required step, the assigned priority may be used in step 106 to determine a position within the queue/dynamic sequence associated with one or more modules 16 configured to perform or execute that particular step relative to one or more other steps in that queue/sequence for generating one or more other beverages. For example, the assigned priority may be used in step 106 to determine which empty slot that step is entered into. In an embodiment, the ECU 14 may be configured to perform step 108. At least one purpose of assigning priorities in the manner described herein is to optimize the utilization of as many modules 16 of the kiosk 10 as possible, as well as to maximize the throughput of the kiosk 10.

Any number of factors or combination of factors or criteria may be used in step 108 to determine or assign a priority to a required step. One factor may be the order in which the order for the specified beverage was received by the kiosk 10 relative to when one or more other orders for other beverages were received (i.e., the order in which beverage orders are received). For example, if the order for the specified beverage was received after an order for a different beverage and both beverages have a required step in common, the required step for the later-ordered specified beverage may be assigned a lower priority than that of the earlier-ordered beverage simply because the order for the specified beverage was received second.

An alternative or additional factor/criteria may be a priority level assigned to the order for the specified beverage. This priority level may be assigned by the customer (e.g., by specifying that the s/he would like the beverage generated immediately, by paying a premium price, etc.) or by the kiosk 10 (e.g., an order placed at the kiosk 10 itself may receive a higher priority than if it were ordered through a remote ordering mechanism, an order placed by a customer having a particular loyalty status may be assigned a higher priority than it otherwise would be assigned, an order received that includes a desired pick-up time that is in the near future may be assigned a higher priority than if it had a later desired pick-up time, etc.).

Yet another factor that may be used in addition to or instead of one or more of those described above relates to the type of module 16 that is required to perform the required step. More particularly, if the kiosk 10 includes a plurality of such modules 16, a required step may receive the same or equal priority as another step in a queue associated with one of those module 16 even if one of the beverages is considered to be a higher priority beverage since there are sufficient resources (i.e., modules 16) to perform multiple steps for multiple beverages simultaneously or at least substantially simultaneously. Conversely, if there is only one module 16 configured to perform the required step, each step in the queue must have a different priority, and those priorities may be determined using, for example, one or more of the other factors described herein.

Yet still another alternative or additional factor that may be taken into consideration is/are the status(es) of other module(s) (or the dynamic sequences/queues thereof) of the kiosk 10. For example, assume that orders for two different beverages—B1 and B2—are received at the same time. Assume further that B1 requires a coffee dispensing step and an additive dispensing step, and B2 only requires a coffee dispensing step. To determine which coffee dispensing step is assigned a higher priority, the status of the queue associated with the additive dispensing module or finisher 34 may be consulted. If the additive dispensing step of beverage B1 can be entered into an empty slot in that queue that overlaps the earliest empty slot in the queue associated with the coffee expressor unit 32, the coffee dispensing step for beverage B2 may be assigned a higher priority than that of beverage B1. This would allow both modules to be active at the same time (i.e., the additive dispensing module 34 performing the additive dispensing step of beverage B1 and the coffee expressor unit 32 performing the coffee dispensing step of beverage B2), rather than the additive dispensing module 34 being idle until the coffee dispensing step of beverage B1 is completed, and slowing the generation of beverage B2 which only requires the coffee dispensing step. As result, the utilization of each module is optimized and the throughput of the kiosk 10 maximized.

It will be appreciated by those having ordinary skill in the art that while only a select few factors have been described above, additional or alternative factors may also be taken into consideration. Additionally, depending on the particular implementation, one or a combination of factors may be used to determine the priority of a given step. Accordingly, the present disclosure is not limited to use of any particular one or combination of factors; rather in different factors or combination of factors may be used in different implementations.

In an embodiment such as that described above wherein a priority is determined and/or assigned to each required step of the specified beverage, method 100 may further include, as illustrated in FIG. 4, a step 110 of periodically re-evaluating and/or updating the priority of one or more of the required steps; and, if appropriate, a step 112 of updating the corresponding queue accordingly. For example, after a module 16 performs one of the steps in the queue associated therewith, the ECU 14 may be configured to re-evaluate and/or update the remaining steps in that queue and reshuffle their priorities. Additionally or alternatively, after a module 16 performs one of the required steps for the specified beverage, the ECU 14 may be configured to re-evaluate and/or update the priority of one or more of the remaining required steps, and, if necessary, update or reshuffle the queue(s) associated with the module(s) 16 configured to perform that or those required step(s), accordingly.

By way of illustration, in an embodiment, a step that had a priority corresponding to the second position in the queue may have its priority elevated to the highest priority; a step having a priority corresponding to the third position in the queue may have its priority elevated to the second highest priority; and so on and so forth. In another example, while a particular module 16 was active performing or executing a required step for one beverage, an order for beverage having a higher priority than the other pending beverages having steps to be performed by that module may be received. In such an instance, the priorities (e.g., the positions) of the steps in the queue may be re-assigned or updated to accommodate the new, higher-priority beverage. In other words, the required step for the new beverage may leap-frog the other steps in the queue corresponding to earlier-ordered beverages even though they were entered into the queue first.

In yet another example, the status of other modules 16 of the kiosk 10 may be taken into account in the same or similar manner as that described above with respect to step 108. For example, assume that there are two beverages being prepared—B1 and B2—and that beverage B1 has a coffee dispensing step in the queue associated with the coffee expressor 32 and an additive dispensing step in the queue associated with the additive dispensing module or finisher 34, and that B2 has a coffee dispensing step in the queue associated with the coffee expressor unit 32. Assume further that the coffee dispensing step of beverage B1 has a higher priority assigned to it than that of beverage B2. Once the coffee expressor unit 32 becomes available, the ECU 14 may look at what steps still have to be performed for each of beverages B1 and B2, and what the status is for the modules 16 configured to perform those remaining steps. In the present example, the ECU 14 will see that beverage B1 has two steps remaining—coffee dispensing and additive dispensing steps, while beverage B2 has only the coffee dispensing step remaining. If the ECU 14 determines that both the coffee expressor unit 32 and the additive dispensing module or finisher 34 are available (or will be in a particular amount of time), the ECU 14 may change the priorities of the coffee dispensing steps of the two beverages such that the coffee dispensing step of beverage B2 is performed by the coffee expressor unit 32 first, while the additive dispensing module 34 performs the additive dispensing step of beverage B1. This will allow both modules 32, 34 to be active rather than module 34 sitting idle until the expressor unit 32 completes the coffee dispensing step of beverage B1, which would be the case if the priorities were not switched/reversed.

While the description thus far has been with respect to an embodiment wherein each module 16 of the kiosk 10 has a queue associated with it that contains the dynamic sequence for that particular module 16 or type of module 16, the present disclosure is not intended to be limited to such an embodiment. For example, in another embodiment, the ECU 14, for example, may maintain a single master schedule that contains one or more dynamic sequence(s) for the module(s) 16 of the kiosk 10. In such an embodiment, as an order for a specified beverage is received in step 102 and translated into one or more steps required to generate the beverage in step 104, step 106 (i.e., step 106') may comprise entering each required step into the master schedule. In addition to being entered into the master schedule, each step may also have a weight or priority assigned to it (step 108). The priority assigned to a step determines the position of that step in a dynamic sequence associated with or corresponding to one or more modules 16 configured to perform that particular step relative to the steps to be performed for other beverages to be generated by the kiosk 10. Accordingly, while in this embodiment each module 16 does not have a dedicated queue, per se, the master schedule includes and maintains what can be considered a queue (sometimes referred to as a virtual queue) for each module 16 or each type of module 16 (e.g., in an embodiment wherein the kiosk 10 includes a plurality of a certain type of module, the master schedule may not differentiate between the different modules, but rather may simply have one queue that serves as the queue for the plurality of modules).

Accordingly, in operation, when a particular module 16 becomes available, the ECU 14 may look at the master schedule and determine the next highest priority step that can be performed by that module 16 or type of module 16 using the sequence that has been developed for that module or type of module. Once the cup into which the beverage corresponding to that highest-priority step has been moved to the appropriate module 16, that module 16 may then perform the step.

As with the embodiment described above, any number of factors may be used to determine and/or assign a priority to each required step. As such, the description of step 108 set forth above applies here with equal weight and will not be repeated; rather it is incorporated here by reference. As also was described with respect to the embodiment described above, in an embodiment wherein the required steps entered into the master schedule in step 106' have a priority associated therewith, the method may further include the step 110 of periodically re-evaluating and/or updating the priority of one or more of the required steps; which may also effectively serve to update the master schedule (i.e., step 112). More particularly, after a module 16 performs one of the steps in the master schedule, the ECU 14 may be configured to re-evaluate the remaining steps in the master schedule to be performed by that particular module 16 or type of module 16, and may reshuffle their priorities. Additionally or alternatively, after a module 16 performs one of the required steps for the specified beverage, the ECU 14 may be configured to re-evaluate and/or update the priority of one or more of the remaining required steps, and, if necessary, reshuffle or update the priorities of the other steps in the master schedule to be performed by the module(s) 16 configured to perform that or those required step(s), accordingly. The description set forth above for re-evaluating and/or updating the priority of one or more steps applies here with equal weight and will not be repeated; rather it is incorporated here by reference.

In any event, after the order for a specified beverage is received in step 102, translated into discrete required steps in step 104, and the required steps are entered into one or more dynamic sequences in step 106/106', method 100 may further include a step 114 of performing one or more, and in an embodiment, each, of the required steps in accordance with the dynamic sequence(s) in which they were entered in order to generate the specified beverage. Accordingly, and as will be appreciated by those having ordinary skill in the art, the ECU 14 of the kiosk 10 may be configured to control both the cup carrier 38 and the module(s) 16 of the kiosk 10 to cause the cup into which the specified beverage is being dispensed to move from module to module as the ECU 14 determines that it is time to perform the next required step of the specified beverage, and the appropriate module(s) 16 for performing that or those steps become(s) available, and to then cause the module(s) 16 to perform the required step(s) to generate the specified beverage. Accordingly, when the cup carrier 38 of the kiosk 10 is available, the ECU 14 may: determine which module(s) 16 of the kiosk 10 is/are ready or available (which it may know from receiving a signal from the module(s) indicating the status of the module(s) or by virtue of its governance of the operation of the module(s) 16); determine from the dynamic sequence(s) associated with or corresponding to that or those modules, which step is to be performed next; and to cause the cup corresponding to the beverage associated with that step to be moved to the appropriate module 16 where the step is performed. Once the beverage generation process is complete, the completed beverage may be delivered to the customer using, for example, the drink presenter 40 of the kiosk 10.

As a result of the optimization and pipelining/traffic engineering enabled and achieved by the sequencing/queuing techniques described herein, in any of the embodiments described above, the particular order in which orders for beverages are received by the kiosk 10 may be irrelevant, and that even though a first beverage was ordered before a second beverage, the steps for the second, later-ordered beverage may be completed and that beverage delivered to the respective customer before the steps of the first, earlier-ordered beverage are completed and that beverage delivered. Accordingly, the systems and methods described herein are not bound by a first in, first out (FIFO) production scheme, which allows for the optimizing of the utilization of the modules 16 of the kiosk 10, and the maximizing of the throughput of the overall system.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of operating an automated beverage generating system, comprising:
   receiving one or more electrical signals representative of an order for a specified beverage;
   translating the order into a first required step and a second required step for generating the specified beverage; and
   entering the first required step into a dynamic sequence corresponding to a first process module of the system configured to perform the first required step, and the second required step into a dynamic sequence corresponding to a second process module of the system configured to perform the second required step, wherein:
   the first process module is configured to perform one or more chemical or mechanical processes contributing to the production of the specified beverage, and wherein the one or more chemical or mechanical processes performed by the first process module correspond to the first required step entered into the dynamic sequence corresponding to the first process module,
   the second process module is configured to perform one or more chemical or mechanical processes contributing to the production of the specified beverage, and wherein the one or more chemical or mechanical processes performed by the second process module correspond to the second required step entered into the dynamic sequence corresponding to the second process module, and each dynamic sequence represents an order in which one or more steps in the dynamic sequence will be performed by the process module corresponding thereto for one or more beverages to be generated by the system.

2. The method of claim 1, further comprising determining a priority for at least one of the first and second required steps, wherein the priority for the at least one of the first and second required steps is used to determine a position of that step within the corresponding dynamic sequence relative to one or more other steps in the dynamic sequence for generating the one or more beverages to be generated by the system.

3. The method of claim 2, wherein the determining step comprises determining the priority for the at least one of the first and second required steps based on at least one of:
   the order in which the order for the specified beverage was received by the system relative to other orders received by the system;
   a priority assigned to the specified beverage;
   the particular type of process module needed to perform the at least one of the first and second required steps; or
   the status of the dynamic sequence(s) corresponding to one or more process modules configured to perform the at least one of the first and second required steps.

4. The method of claim 2, wherein the determined priority for the at least one of the first and second required steps and the position of that required step in the corresponding dynamic sequence results in a change in the order in which the process module corresponding to that dynamic sequence performs the steps therein for the one or more beverages to be generated by the system.

5. The method of claim 2, further comprising periodically updating the priority for the at least one of the first and second required steps, and therefore, the position of the at least one of the first and second required steps in the dynamic sequence corresponding thereto.

6. The method of claim 1, wherein entering at least one of the first or second required steps comprises:
   accessing a queue for each of a plurality of process modules of the system configured to perform that particular required step, wherein each queue contains the dynamic sequence corresponding to the process module with which the queue is associated; and
   entering that particular required step for the specified beverage into an empty slot in the queue of one of the plurality of process modules, the empty slot corresponding to a position in the queue at which that particular required step for the specified beverage will be performed by the process module associated with the queue relative to one or more other steps in the queue for generating the one or more beverages to be generated by the system.

7. The method of claim 1, further comprising performing each of the first and second required steps in accordance with the dynamic sequence in which that particular required step was entered to generate the specified beverage.

8. The method of claim 7, comprising completing all of the required steps for the specified beverage before all of the required steps for generating an earlier-ordered beverage are completed.

9. The method of claim 1, wherein:
   entering the first required step into the dynamic sequence corresponding to the first process module of the system comprises:
      accessing a queue associated with the first process module wherein the queue contains the dynamic sequence corresponding to the first process module; and
      entering the first required step into an empty slot in that queue, the empty slot corresponding to a position in the queue at which the first required step for the specified beverage will be performed by the first process module relative to one or more steps in the queue for generating the one or more beverages to be generated by the system; and
   entering the second required step into the dynamic sequence corresponding to the second process module of the system comprises:
      accessing a queue associated with the second process module wherein the queue contains the dynamic sequence corresponding to the second process module; and
      entering the second required step into an empty slot in that queue, the empty slot corresponding to a position in the queue at which the second required step for the specified beverage will be performed by the second process module relative to one or more steps in the queue for generating the one or more beverages to be generated by the system.

10. The method of claim 9, wherein the empty slot in one or both of the queues associated with the first and second modules is at the end of the queue.

11. The method of claim 9, wherein the empty slot in one or both of the queues associated with the first and second modules is between two occupied slots in the queue.

12. The method of claim 1, wherein translating the order comprises looking up the specified beverage in a data structure that correlates at least one beverage with steps required to generate the at least one beverage to determine the required steps for the specified beverage.

13. A method of operating an automated beverage generating system, comprising:
   receiving one or more electrical signals representative of an order for a specified beverage;
   translating the order into a first required step and a second required step for generating the specified beverage; and
   entering the first required step into a dynamic sequence corresponding to a first process module of the system configured to perform the first required step, and the second required step into a dynamic sequence corresponding to a second process module of the system configured to perform the second required step, wherein:
      the first process module is configured to perform one or more chemical or mechanical processes contributing to the production of the specified beverage, and wherein the one or more chemical or mechanical processes performed by the first process module correspond to the first required step entered into the dynamic sequence corresponding to the first process module,
      the second process module is configured to perform one or more chemical or mechanical processes contributing to the production of the specified beverage, and wherein the one or more chemical or mechanical processes performed by the second process module correspond to the second required step entered into the dynamic sequence corresponding to the second process module,
      each dynamic sequence represents an order in which one or more steps in the dynamic sequence will be performed by the process module for one or more beverages to be generated by the system, and the entering step comprises entering at least one of the first and second required steps in a position of the corresponding dynamic sequence that is ahead of a step for an earlier-ordered beverage such that the required step for the later-ordered specified beverage is performed before the step for the earlier-ordered beverage.

14. The method of claim 13, wherein entering each of the first and second required steps comprises:

accessing a queue associated with the process module of the system that is configured to perform that particular required step, wherein the queue contains the dynamic sequence corresponding to the process module configured to perform the required step; and entering the required step for the specified beverage into an empty slot in that queue, the empty slot corresponding to a position in the queue at which the required step for the specified beverage will be performed by the process module relative to one or more other steps in the queue for generating the one or more beverages to be generated by the system.

15. The method of claim 13, further comprising performing each of the first and second required steps in accordance with the dynamic sequence in which that particular required step was entered to generate the specified beverage.

\* \* \* \* \*